United States Patent
Yang et al.

(10) Patent No.: US 10,592,769 B2
(45) Date of Patent: Mar. 17, 2020

(54) SEARCHING FOR IMAGES BY VIDEO

(71) Applicant: Microsoft Technology Licensing, LLC, Redmond, WA (US)

(72) Inventors: Linjun Yang, Beijing (CN); Xian-Sheng Hua, Sammamish, WA (US); Yang Cai, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 117 days.

(21) Appl. No.: 15/240,838

(22) Filed: Aug. 18, 2016

(65) Prior Publication Data
US 2016/0358036 A1 Dec. 8, 2016

Related U.S. Application Data

(63) Continuation of application No. 13/110,708, filed on May 18, 2011, now Pat. No. 9,443,011.

(51) Int. Cl.
*G06T 7/194* (2017.01)
*G06K 9/38* (2006.01)
(Continued)

(52) U.S. Cl.
CPC ....... *G06K 9/4676* (2013.01); *G06F 16/7844* (2019.01); *G06F 16/7847* (2019.01);
(Continued)

(58) Field of Classification Search
CPC ............ G06N 99/005; G06F 17/30864; G06F 17/2785; G06F 17/30011; G06F 17/243;
(Continued)

(56) References Cited

U.S. PATENT DOCUMENTS 5,576,950 A 11/1996 Tonomura et al.
8,358,840 B2 1/2013 Bronstein et al.
(Continued)

OTHER PUBLICATIONS

Sivic et al., Efficient Visual Search of Videos Cast as Text Retrieval, May 2, 2008 (1st public dissemination) [retrieved Dec. 28, 2017], IEEE Transactions on Pattern Analysis and Machine Intelligence, vol. 31, Issue: 4, Apr. 2009,pp. 591-606. Retrieved from the Internet: http://ieeexplore.ieee.org/document/4509438/#full-text-section.*

(Continued)

*Primary Examiner* — Andrew M Moyer
*Assistant Examiner* — Dennis Rosario
(74) *Attorney, Agent, or Firm* — Schwegman Lundberg & Woessner, P.A.

(57) ABSTRACT

Techniques describe submitting a video clip as a query by a user. A process retrieves images and information associated with the images in response to the query. The process decomposes the video clip into a sequence of frames to extract the features in a frame and to quantize the extracted features into descriptive words. The process further tracks the extracted features as points in the frame, a first set of points to correspond to a second set of points in consecutive frames to construct a sequence of points. Then the process identifies the points that satisfy criteria of being stable points and being centrally located in the frame to represent the video clip as a bag of descriptive words for searching for images and information related to the video clip.

17 Claims, 10 Drawing Sheets

(51) Int. Cl.
G06K 9/46 (2006.01)
G06F 16/783 (2019.01)
G06K 9/00 (2006.01)
G06K 9/62 (2006.01)

(52) U.S. Cl.
CPC ..... G06K 9/00671 (2013.01); G06K 9/00744 (2013.01); G06K 9/38 (2013.01); G06K 9/4642 (2013.01); G06K 9/4671 (2013.01); G06K 9/623 (2013.01); G06T 7/194 (2017.01)

(58) Field of Classification Search
CPC .. G06F 17/30047; G06F 16/58; G06F 16/583; G06F 16/9535; G06F 16/951; G06F 16/248; G06F 16/7837; G06F 16/7328; G06F 16/743; G06K 9/4676; G06K 9/6256; G06K 9/6201; G06K 9/38; G06K 9/00771; G06T 7/11; G06T 2207/10016; G06T 7/194; G06T 7/20; G06T 2207/30232; G06T 2207/20224
See application file for complete search history.

(56) References Cited

U.S. PATENT DOCUMENTS

| | | | |
|---|---|---|---|
| 2009/0106232 A1* | 4/2009 | Burges | G06F 17/30864 |
| 2010/0149419 A1 | 6/2010 | Mei et al. | |
| 2013/0132377 A1 | 5/2013 | Lin et al. | |
| 2016/0358036 A1* | 12/2016 | Yang | G06K 9/4671 |

OTHER PUBLICATIONS

Sivic et al., Object Level Grouping for Video Shots, Jan. 1, 2006:1st Online [retrieved Jul. 20, 2018], International Journal of Computer Vision, Apr. 2006, vol. 67, Issue 2, pp. 189-210. Retrieved from the Internet: https://link.springer.com/article/10.1007/s11263-005-4264-y.*

Ji et al., Actor-independent action search using spatiotemporal vocabulary with appearance hashing, Mar. 2011 [retrieved Aug. 15, 2019], Pattern Recognition, vol. 44, Issue 3, pp. 624-638. Retrieved: https://www.sciencedirect.com/science/article/pii/S0031320310004085 (Year: 2011).*

Affendey, et al. "Video Data Modelling to Support Hybrid Query"—Published Date: Sep. 2007 http://paper.ijcsns.org/07_book/200709/20070907.pdf, 9 pages.

Fushikada, et al., "A Content-based Video Query Agent using Feature-based Image Search Engine"—Published Date: 1999 http://ieeexplore.ieee.org/stamp/stamp.jsp?tp=&arnumber=798525 5 pages.

Gao, et al. "Video Image Retrieval Based on Improved SIFT Features"—Published Date: May 27, 2010 http://ieeexplore.ieee.org/stamp/stamp.jsp?tp=&arnumber=5473328 4 pages.

"Google Goggles", Wikipedia, the free encyclopedia, retrieved on Aug. 5, 2011 at <<http://en.wikipedia.org/wiki/Google_Goggles>>, 3 pages.

Jian, et al. "Query by Video Clip"—Published Date: Aug. 16, 1998 http://ieeexplore.ieee.org/stamp/stamp.jsp?tp=&arnumber=711299, 3 pages.

Painter, et al. Compression of Video Frame Patches for Temporal Feature Extraction—Published Date: Mar. 2010 http://www.stanford.edu/~jpainter/documents/Compression%20of%20Video%20Frame%, 5 pages.

TechCrunch, Search by Sight With Google Goggles—Retrieved Date: Jan. 4, 2011 http://techcrunch.com/2009/12/07/google-goggles/ 15 pages.

* cited by examiner

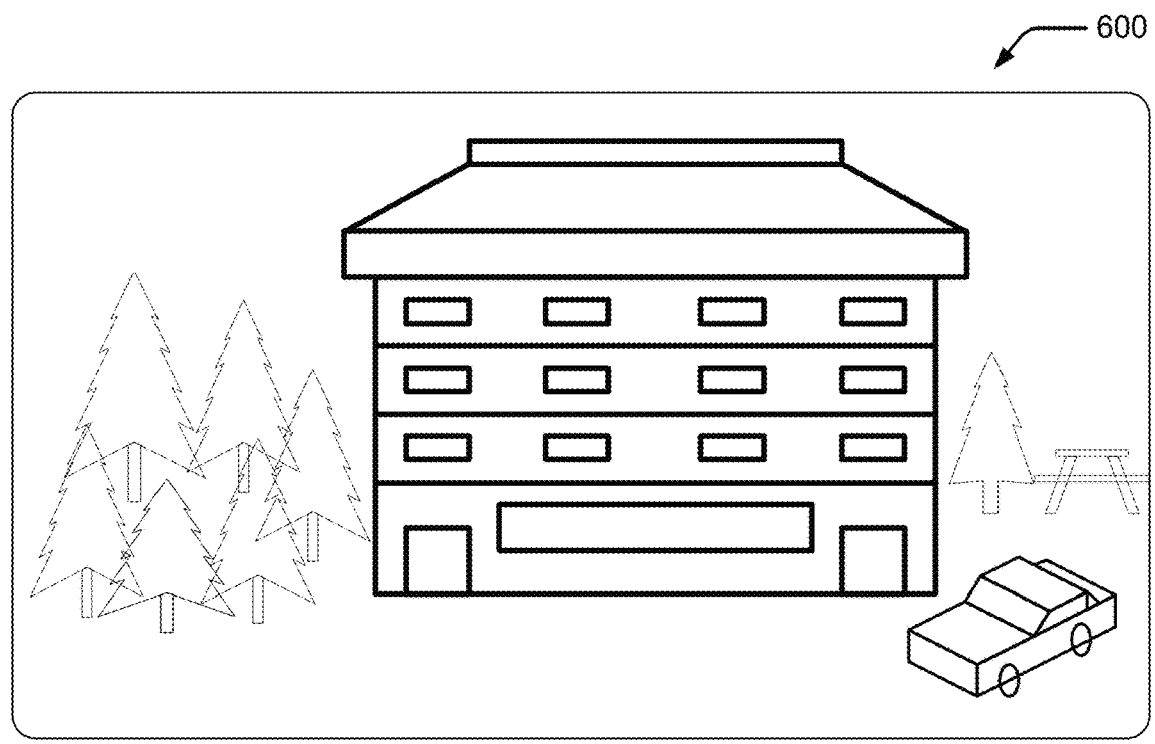
FRAME OF VIDEO
602
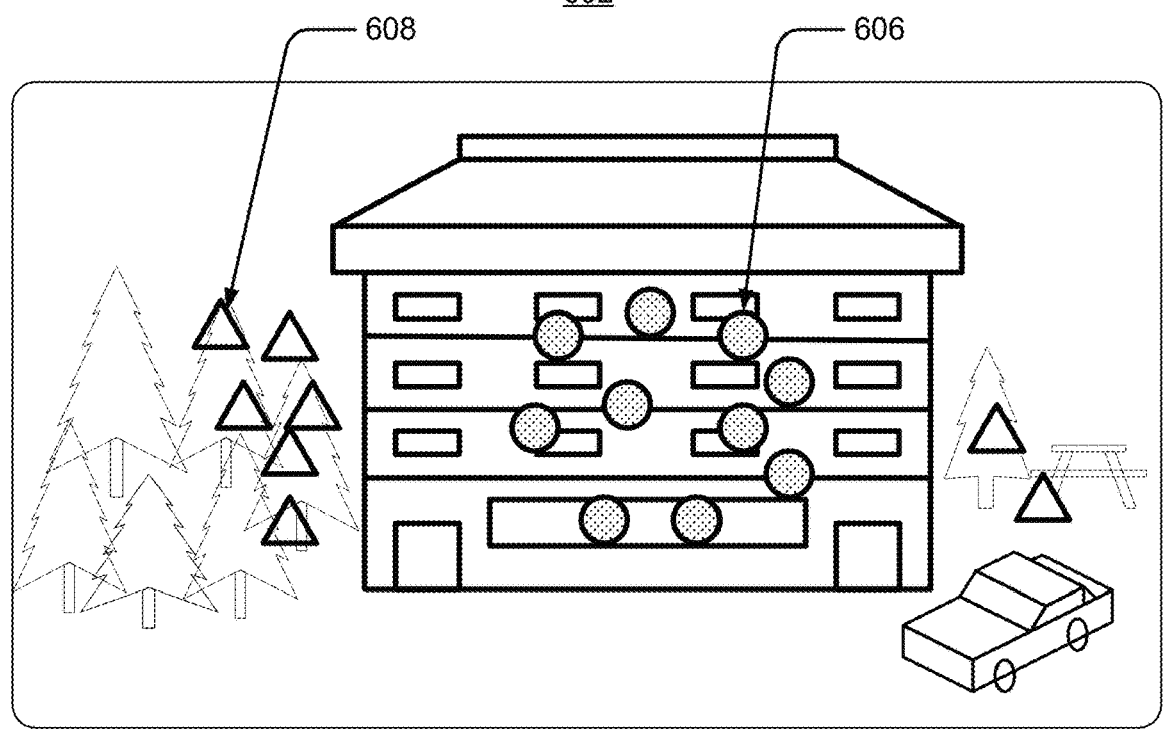
FRAME OF VIDEO WITH POINTS
604
FIG. 6

| IMAGES | INFORMATION |
|---|---|
| 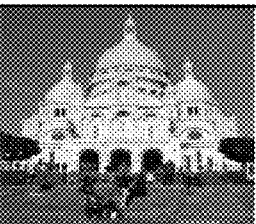 ① | BASILICA OF SACRE-COEUR LOCATED IN PARIS, FRANCE, COMPLETED IN 1914 ... |
| 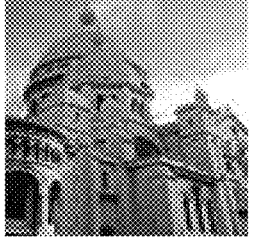 ② | BASICLICA OF SACRED HEART OF PARIS, LOCATED AT SUMMIT OF BUTTE MONTMARTE, HIGHEST POINT IN CITY ... |
|  ③ | BASILICA, ROMAN CATHOLIC CHURCH, PORTICO WITH THREE ARCHES, BUILT OF TRAVERTINE STONE, ... |
| ⋮ | ⋮ |
| 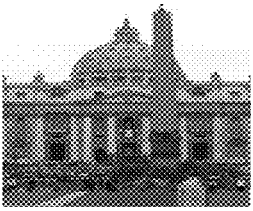 ⓝ | ST. PETER'S BASICLICA LOCATED IN VATICAN CITY, ONE OF HOLIEST CATHOLIC SITES, CONSECRATED IN 1626, RENAISSANCE AND BAROGQUE STYLE ... |

FIG. 8

| DESCRIPTION | IMAGES |
|---|---|
| ① BASILICA OF SACRE-COEUR LOCATED IN PARIS, FRANCE, COMPLETED IN 1914 ... |  ① |
| ② BASILICA, ROMAN CATHOLIC CHURCH, PORTICO WITH THREE ARCHES, BUILT OF TRAVERTINE STONE, | 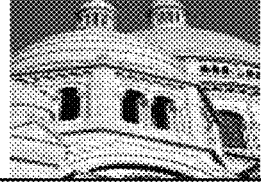 ② |
| ③ BASICLICA OF SACRED HEART OF PARIS, LOCATED AT SUMMIT OF BUTTE MONTMARTE, HIGHEST POINT IN CITY ... |  ③ |
| ④ ST. PETER'S BASICLICA LOCATED IN VATICAN CITY, ONE OF HOLIEST CATHOLIC SITES, CONSECRATED IN 1626, RENAISSANCE AND BAROGQUE STYLE ... | 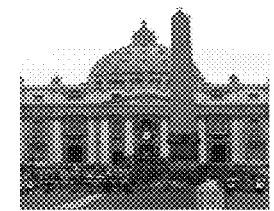 ④ |
| ⋮ | ⋮ |
| ⓝ Xxxx | 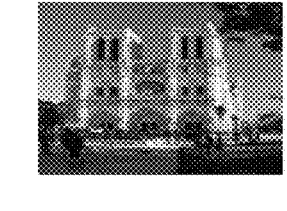 ⓝ |

SUBMIT EVALUATION

FIG. 9

SEARCHING FOR IMAGES BY VIDEO

RELATED APPLICATIONS

This application claims priority to and is a continuation of U.S. patent application Ser. No. 13/110,708, filed on May 18, 2011, the entire contents of which are incorporated herein by reference.

BACKGROUND

The increasing popularity of image recognition applications provides new mechanisms for users based on the ease of use with cameras in mobile devices. The image recognition application provides convenience as users easily capture images on their cameras to be submitted as queries. The image recognition application performs searches based on images as queries, such as photographs, barcodes, and the like. Typically, the image recognition application relies on the image submitted to retrieve related information from the World Wide Web. For example, the user may submit a photograph of a famous landmark. The image recognition application evaluates images that are similar from a database to retrieve the related information about the famous landmark, without having received a text-based query.

However, the image recognition application has drawbacks as it may not be able to identify a main object in the image or to decipher the image. Also, other problems in retrieving related information may occur when the image is blurred, occluded, small, or in a viewpoint different from the images to be retrieved from the database. Furthermore, the image recognition application may retrieve information that is not relevant, such as an entire image in the query rather than the main object in the image being submitted as the query. Also, the search results tend to be inconsistent as the image recognition application may not return the same information each time when the same image is submitted as a query. Thus, it becomes difficult to retrieve relevant information.

SUMMARY

This disclosure describes receiving a video clip submitted as a query and retrieving images or information associated with the images in response to the query. In an implementation, this process occurs when an image-retrieval application receives the video clip to be decomposed into frames. The image-retrieval application extracts scale-invariant feature transform (SIFT) features from a frame and then quantizes the SIFT features into descriptive words. The image-retrieval application further tracks the SIFT points in the frame, a first set of SIFT points to correspond to a second set of SIFT points in consecutive frames to construct a sequence of points. The image-retrieval application further computes values for the SIFT points based on a number of points in the sequence of points and center values of the SIFT points of the frame to identify the SIFT points representing the video clip as a bag of descriptive words, for searching for images or information in response to the video clip as the query.

In another implementation, a process creates an image-retrieval model to construct a representation of a video clip with an object of interest submitted as a query. The process retrieves images from a database in response to the representation of the video clip by computing a similarity score between the images from the video clip and the database to identify top candidate search images. The process re-ranks the top candidate search images based at least in part on combining (1) the calculated similarity score between the images in a top search result and the images in the frames of the video clip and (2) an average gradient function to reflect temporal consistency information of matching scores for adjacent frames.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

FIG. 6 illustrates example diagrams of a frame in the video clip and the frame with identified points on features.

FIG. 8 illustrates an example user interface of providing retrieved images and information associated with the images to the user.

FIG. 9 illustrates another example user interface of providing retrieved images and information associated with the images to the user.

DETAILED DESCRIPTION

Overview

Figure 1:
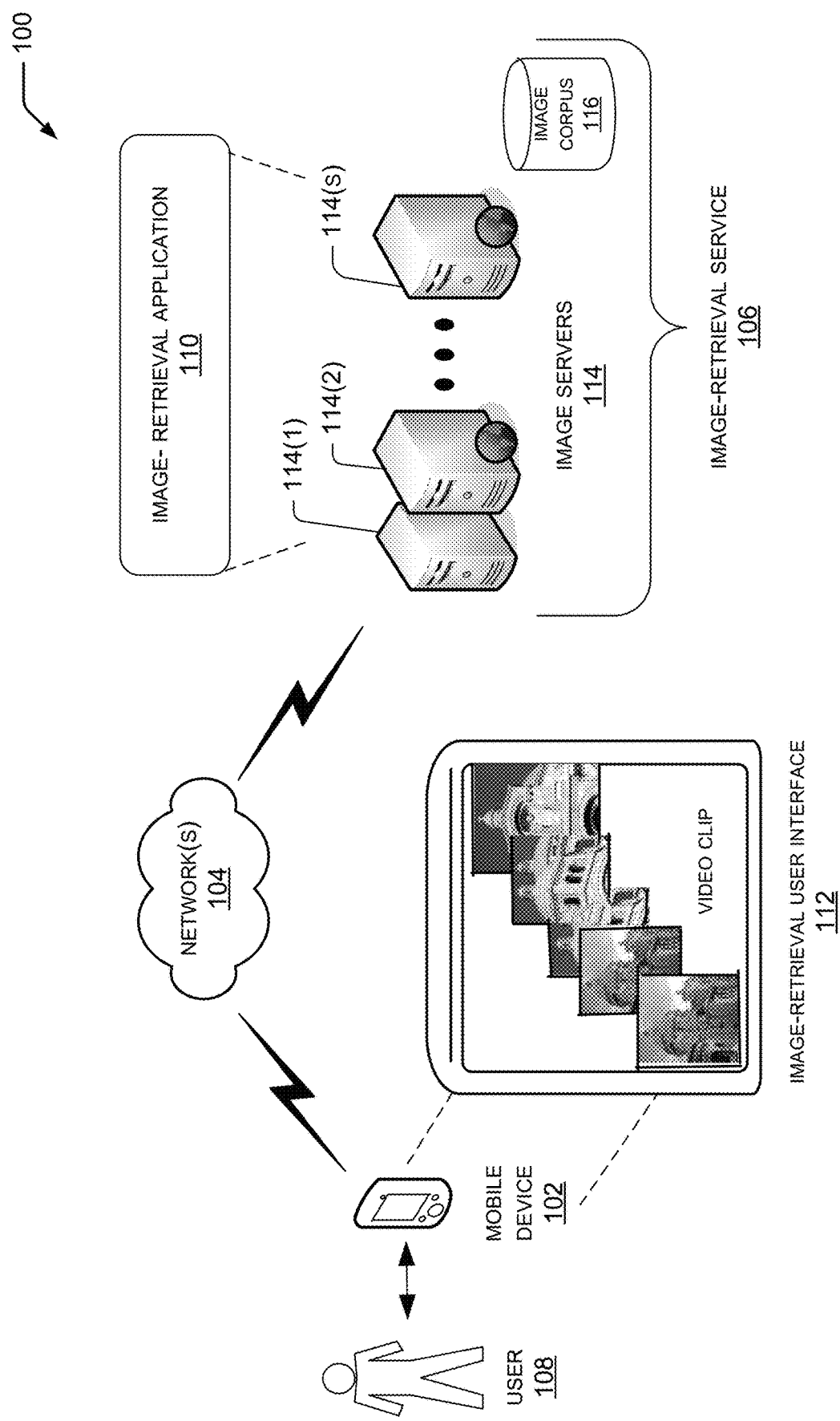
FIG. 1 illustrates an example environment to support architecture for submitting a video clip as a query by a user and searching for images and information associated with the images in response to the query.

This disclosure describes providing search results by identifying images to be retrieved or information associated with the images in response to a video clip submitted as a query by a user. Initially, the user records a video and submits the video clip including an object of interest, typically captured in a center of the object. The video clip submitted as the query offers multiple viewpoints of the object of interest taken from various angles. Specifically, the user records multiple images of the object of interest while moving relative to the object of interest. For instance, the user may move around, above, below, closer to or further from the object of interest. In addition, the video clip submitted as the query offers varying scales of the object of interest. For example, the user records the video of the object of interest using the zoom-in and zoom-out features of the camera. The user determines which portions of the video to submit that captures the object of interest where the video clip may range from a few seconds to several minutes. Furthermore, the video clip submitted as the query offers items surrounding the object of interest that remain constant in the frames of the video clip. For example, the items surrounding the object of interest may include but are not limited to, an adjacent building, a bridge, an island, and the like. The items tend to appear in a relationship in the frame that is constant relative to the object of interest. The items appear as background information that may further help identify the object of interest during the retrieval process.

An image-retrieval application provides the images or information associated with the images in response to the video clip submitted as the query. For instance, envision that a user from another country visiting the United States captures a video of the Statue of Liberty on Liberty Island in New York Harbor. The user submits the video clip of the Statute of Liberty as the query to the image-retrieval application. The image-retrieval application evaluates the multiple viewpoints and varying scales of images of the video clip to identify the object of interest as the Statue of Liberty. The image-retrieval application takes the object of interest, the Statue of Liberty, and items surrounding the Statue of Liberty into account when providing the search results for images and information to the user. The image-retrieval application provides the retrieved images and information as ranked items in a descending order, in some instances. The images retrieved and information may include the Statue of Liberty, other statues located in New York City or other cities, and the like. In an example, the information may include a description about the Statue of Liberty, such as "female statue carrying torch, symbol of freedom and of the United States, located on Liberty Island in NY Harbor."

In another example, the image-retrieval application may provide top-related search results and then re-rank the images retrieved based on the temporal information, such as the items surrounding the object of interest that should remain constant in the frames of the video clip. Using the Statue of Liberty as an example, items surrounding it may include Fort Wood, which serves as a base for the Statue of Liberty with a star-shaped fortification and Liberty Island, which serves as the island location for the Statue of Liberty. The temporal information of Fort Wood and the background of Liberty Island may be captured in the video clip of the Statute of Liberty and available to further identify the object of interest, when re-ranking the top search results.

Initially, the image-retrieval application may receive or collect images from users who have given permission for their data to be collected in an image corpus, from other databases, or from World Wide Web. Using the images, the image-retrieval application extracts features from them to identify descriptive words to describe the features. This information may be referred to as an image database, which is a collection of images that have been submitted by the users along with the descriptive words to describe the features in the images.

The search results for the images and the information may be provided in search engines and websites. In some implementations, the images and/or the information may be presented in a drop-down list in an Internet browser, a website, local databases, or local operating systems.

While aspects of described techniques can be implemented in any number of different computing systems, environments, and/or configurations, implementations are described in the context of the following the example computing environment.

Illustrative Environment

FIG. 1 illustrates an example architectural environment 100, usable to retrieve images and information based on the video clip submitted as the query. The environment 100 includes an example mobile device 102, which is illustrated as a smart phone. The mobile device 102 is configured to connect via one or more networks 104 to access an image-retrieval service 106 for a user 108. The mobile device 102 may take a variety of forms, including, but not limited to, a portable handheld computing device (e.g., a personal digital assistant, a smart phone, a cellular phone), a personal navigation device, a laptop computer, a desktop computer, a portable media player, a camera, a video recorder, or any other device capable of connecting to one or more networks 104 to access the image-retrieval service 106 for the user 108. In some instances, the user 108 may record a video on a camera and transfer the video to the mobile device 102 or the camera may be capable of accessing the network 104.

The network 104 represents any type of communications networks, including wire-based networks (e.g., public switched telephone, cable, and data networks) and wireless networks (e.g., cellular, satellite, WiFi, and Bluetooth).

The image-retrieval service 106 represents an application service that may be operated as part of any number of online service providers, such as a web service, a search engine, map service, social networking website, or the like. Also, the image-retrieval service 106 may include additional modules or may work in conjunction with modules to perform the operations discussed below. In an implementation, the image-retrieval service 106 may be implemented at least in part by an image-retrieval application 110 executed by servers, or by a image-retrieval application stored in memory of the mobile device 102.

In the illustrated example, the mobile device 102 may include an image-retrieval user interface (UI) 112 that is presented on a display of the mobile device 102. The UI 112 facilitates access to the image-retrieval service 106 to submit the video clip. The UI 112 displays the retrieved images and information associated with the retrieved images in response to the video clip. The UI 112 may also display a ranking of the images retrieved.

FIG. 1 illustrates the user 108 employing the UI 112 when accessing the image-retrieval service 106. For example, the user 108 may access the image-retrieval service 106 or the image-retrieval application 110 to input the video clip of a landmark, Basilica of Sacre-Coeur located in Paris. The UI 112 illustrates the video clip taken from multiple viewpoints of the architecture of the Basilica of Sacre-Coeur and with the zoom-in and zoom-out features of the portico of the Basilica of Sacre-Coeur with its arches. An example of the video clip illustrates: an initial frame of the Basilica when the user 108 walks toward the building, another frame of the Basilica when the user 108 approaches the building, and another frame of the Basilica when the user 108 zooms in on the details of the building.

In the illustrated example, the image-retrieval service 106 and the image-retrieval application 110 are hosted on one or more servers, such as image server 114(1), 114(2), . . . , 114(S), accessible via the network 104. The image servers 114(1)-(S) may be configured as plural independent servers, or as a collection of servers that are configured to perform larger scale functions accessible by the network 104. The image servers 114 may be administered or hosted by a network service provider. The image-retrieval service 106 may be implemented by the image servers 114 and the image-retrieval application 110 to and from the mobile device 102.

The environment 100 includes an image corpus 116, which may be stored on a separate server or with the representative set of servers 114 that is accessible via the network 104. The image corpus 116 may store the images and descriptive words describing the features extracted from the images. The image-retrieval application 110 may then retrieve images and information from the image corpus 116, which may be updated on a predetermined time interval.

FIGS. 2-5 and 7 illustrate flowcharts showing example processes. The processes are illustrated as a collection of blocks in logical flowcharts, which represent a sequence of operations that can be implemented in hardware, software, or a combination. For discussion purposes, the processes are described with reference to the computing environment 100 shown in FIG. 1. However, the processes may be performed using different environments and devices. Moreover, the environments and devices described herein may be used to perform different processes.

For ease of understanding, the methods are delineated as separate steps represented as independent blocks in the figures. However, these separately delineated steps should not be construed as necessarily order dependent in their performance. The order in which the process is described is not intended to be construed as a limitation, and any number of the described process blocks maybe be combined in any order to implement the method, or an alternate method. Moreover, it is also possible for one or more of the provided steps to be omitted.

Figure 2:
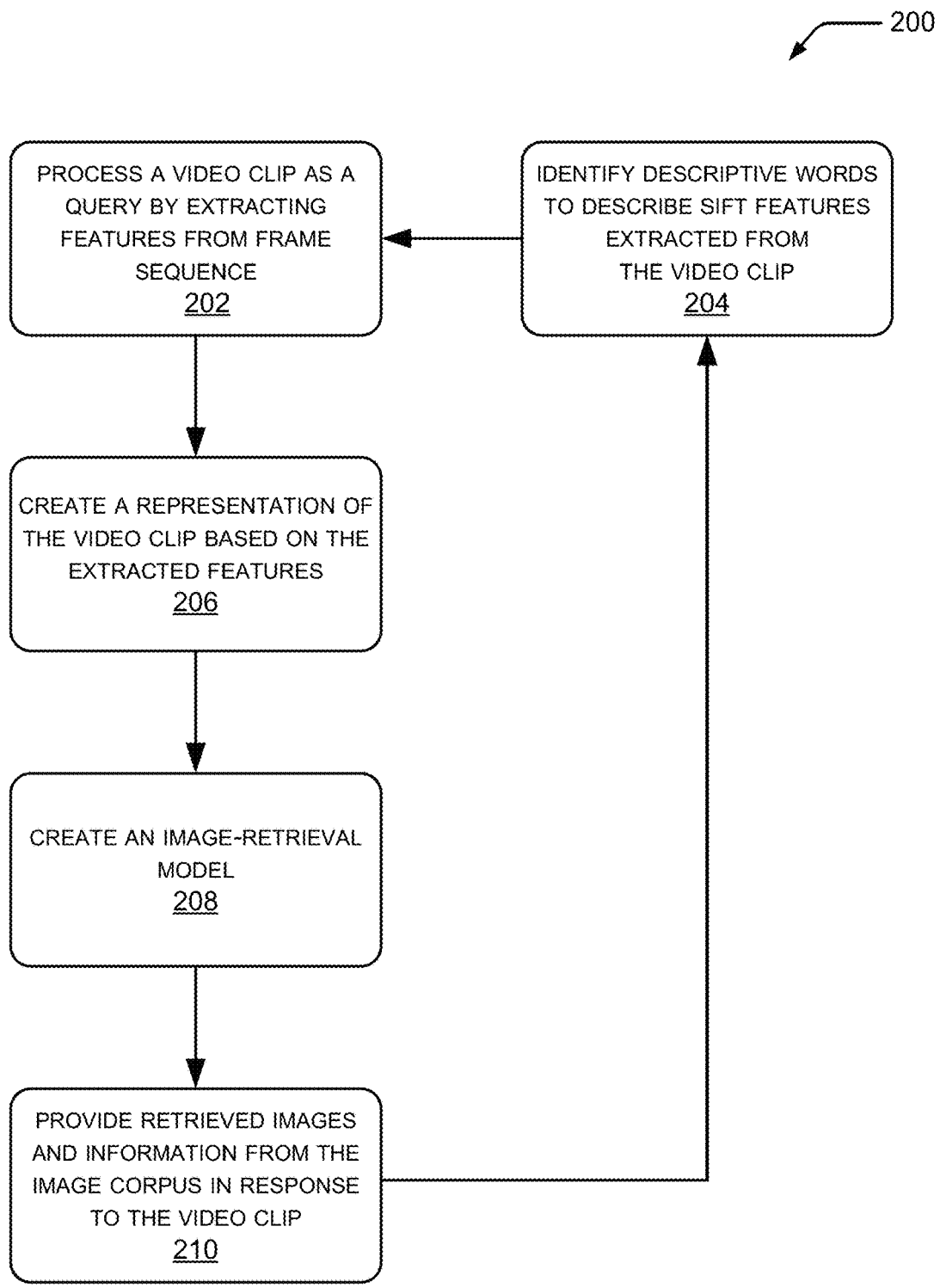
FIG. 2 illustrates example high-level functions for processing the video clip submitted as the query, identifying descriptive words to describe features in the video clip, creating a representation of an object of interest in the video clip, creating an image-retrieval model, and retrieving images and information associated with the images.

FIG. 2 illustrates a flowchart showing an example process 200 of high-level functions performed by the image-retrieval application 110. The process 200 may be divided into five phases, an initial phase 202 to process the video clip submitted as the query, a second phase 204 to identify descriptive words to describe SIFT features extracted from the video clip, a third phase 206 to create a representation of an object of interest in the video clip based on the extracted features, a fourth phase 208 to create an image-retrieval model, and a fifth phase 210 to provide retrieved images and information from the image corpus in response to the video clip. All of the phases may be used in the environment of FIG. 1, may be performed separately or in combination, and without any particular order.

The first phase 202 processes the video clip submitted as the query by decomposing the video clip into a frame sequence. Also, the image-retrieval application 110 extracts scale-invariant feature transform (SIFT) features from a frame in the sequence.

The second phase 204 identifies descriptive words to describe the SIFT features extracted from a frame. Initially, the image-retrieval application 110 extracts features from images collected in an image corpus to describe their extracted features. The image-retrieval application 110 applies the descriptive words and the extracted features to build a word codebook to help describe the SIFT features.

The third phase 206 creates a representation of the video clip based on the extracted SIFT features. The representation includes tracking SIFT points in multiple frames and computing values for the points for the object of interest by filtering out the points that do not satisfy a criteria.

The fourth phase 208 creates an image-retrieval model. The image-retrieval application 110 selects from points that satisfy the criteria that are larger than a threshold number.

The fifth phase 210 retrieves images and information from the image corpus in response to the video clip. The image-retrieval application 110 computes similarity scores between the images in the video clip and the images from the image corpus to identify top search results. Details of the phases are discussed with reference to FIGS. 3-10 below.

Processing A Video Clip

Figure 3:
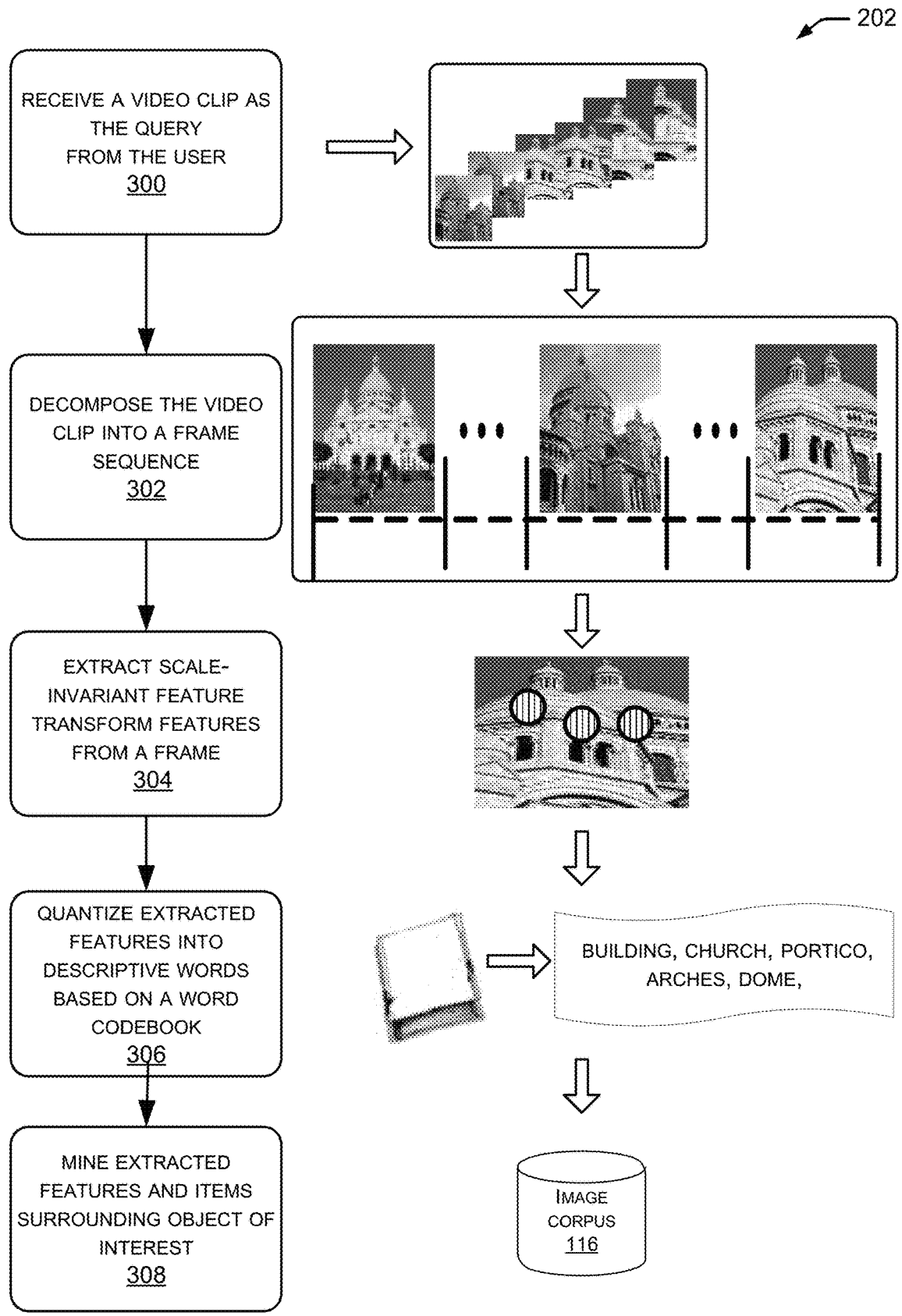
FIG. 3 illustrates an example process of processing the video clip submitted as the query.

FIG. 3 illustrates an example process 202 of processing the video clip submitted as the query 204 (discussed at a high level above). The user 108 records the object of interest in the video and submits the video clip having the object of interest. This figure illustrates the image-retrieval application 110 receives the video clip as the query from the user 300.

The image-retrieval application 110 decomposes or divides the video clip into a frame sequence 302. The process splits the video clip into previous frames, adjacent frames, and subsequent frames, depending on where tracking of the points occurs. An example of the video clip split into a frame sequence illustrates: an initial frame of the Basilica when the user 108 walks toward the building, other adjacent frames as the user 108 walks closer (not shown), another frame of the Basilica when the user 108 approaches the building, other adjacent frames as the user 108 is in front of the building (not shown), and another frame of the Basilica when the user 108 zooms in on the details of the building. This is merely an example of a frame sequence that may occur, the frame sequence may be decomposed in any manner suitable for extracting features from the frames.

The image-retrieval application 110 extracts SIFT features from a frame in the sequence 304. The extracted SIFT features from the frame help further identify the object of interest with points (to be shown as circles) on the frames.

The image-retrieval application 110 quantizes the extracted features into descriptive words based on a word codebook 306. The descriptive words correlate to the extracted features when attempting to locate images that are similar from the image corpus 116. For instance, the descriptive words describing the extracted features with points shown as circles may include: "building, church, portico, arches, and dome."

The image-retrieval application 110 mines the extracted features and items surrounding the object of interest 308. This information may be kept in the image corpus 116 to derive a representation of the object of interest.

Identify Descriptive Words to Describe SIFT Features from Video Clip

Figure 4:
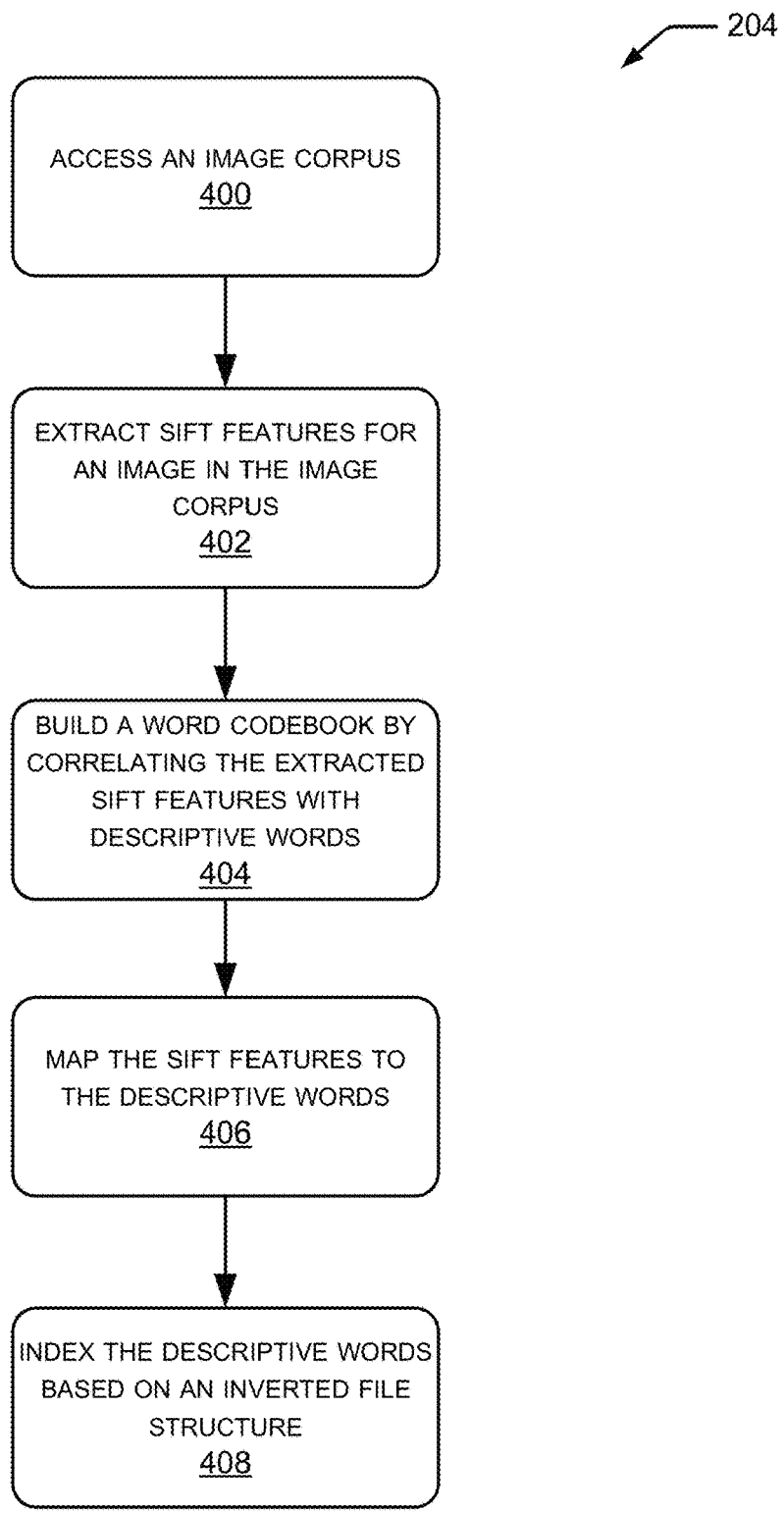
FIG. 4 illustrates an example process of identifying descriptive words from an image corpus to describe features extracted from the video clip.

FIG. 4 illustrates an example process 204 of identifying descriptive words from the image corpus to describe features extracted from the video clip (discussed at a high level above).

The image-retrieval application 110 accesses the image corpus 400. As discussed earlier, the image corpus 116 includes a collection of images submitted by users, obtained from the World Wide Web, obtained from other databases, social networks, services on the web, or the like. This collection of images is based on the users giving permission to opt-in for their images to be included as a part of the data collection. The options are that the individual user may choose to opt-in to participate or to opt-out to not participate in their sharing of images. In another implementation, a database stores the images.

The image-retrieval application 110 extracts SIFT features for an image in the image corpus 402. The extracted SIFT features from the image help identify a main object in the image and to correlate descriptive words to the features.

The image-retrieval application 110 further builds a word codebook by correlating the extracted SIFT features with descriptive words 404. The descriptive words help identify the extracted features when attempting to locate images from the image corpus 116. The word codebook described here was used when quantizing the extracted features of the video clip into descriptive words as discussed in FIG. 3.

The image-retrieval application 110 maps the SIFT features to the descriptive words 406. The SIFT features may be organized and identified belonging to certain descriptive words.

The image-retrieval application 110 indexes the descriptive words based on an inverted file structure 408. The inverted file structure stores the mapping from the descriptive words to its location in the image corpus 116. The inverted file structure helps process the search in a more efficient way to take less time to find images in response to the video clip.

Create a Representation of an Object of Interest in the Video Clip

Figure 5:
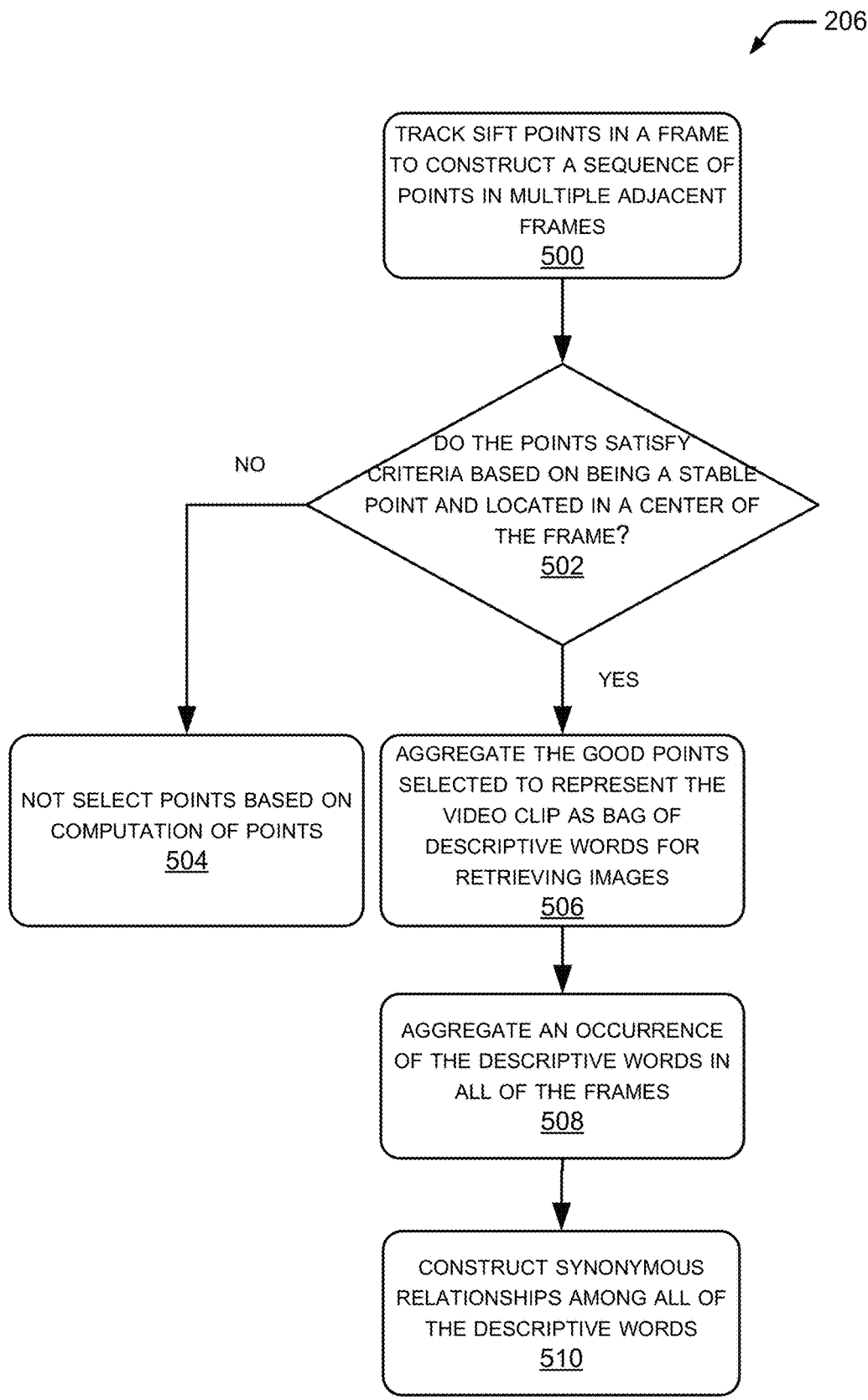
FIG. 5 illustrates an example process of creating a representation of the object of interest in the video clip.

FIG. 5 illustrates an example process 206 of creating a representation of the object of interest in the video clip (discussed above). In an example, the process may be performed by the image-retrieval application 110.

The image-retrieval application 110 tracks the SIFT points in the frame to construct a sequence of points in multiple adjacent frames 500. A sequence of points may be defined as a sequence composed of the SIFT points in temporarily adjacent frames. The points in a current frame may correspond or match relative to of the points in the adjacent frames based on tracking the frames. The image-retrieval application 110 tracks the SIFT points detected in a previous frame and aligns the tracked positions in a subsequent frame to one of the SIFT points. This process 206 identifies the SIFT points which are not more than one pixel away from the tracked positions as candidates for a tracked SIFT point. Next, the image-retrieval application 110 selects a candidate that is most similar to a corresponding SIFT point in the previous frame as the tracked SIFT point. Then, the process 206 provides an estimate of a SIFT similarity based on a Euclidian distance between their descriptors. The process 206 provides estimates of the SIFT similarity for each pair of adjacent frames in the video clip to identify corresponding points that occur in sequence, based on tracking the SIFT points in the frames.

The sequence of points obtained may be represented by a set $S_k$ as:

$$S_k = \{p_i^j\}$$

where $k^{th}$ represents the sequence of points including several SIFT points and $p_i^j$ represents a $j^{th}$ SIFT point in a $i^{th}$ frame.

At 502, the image-retrieval application 110 asks: do the points satisfy criteria based on being a stable point and located in a center of the frame? The image-retrieval application 110 evaluates whether the points may be tracked and may correspond in multiple adjacent frames to classify the points as stable points and clearly identifiable. Also, the image-retrieval application 110 further evaluates whether the points located in the center of the frames are more important than the other objects or items in the frames. This evaluation relies on users' intention to record the object of interest in the center of the frame when capturing the video.

The image-retrieval application 110 evaluates the criteria of the points based on a combination of a stableness term and a center-awareness term by using the following equation:

$$G(p_i^j) = \alpha \times \frac{Len(S(p_i^j))}{FrameCount} + (1-\alpha) \times Cent(p_i^j)$$

where $G(p_i^j)$ represents "good points" that satisfy the criteria, $p_i^j$ represents each point, $S(p_i^j)$ represents a corresponding sequence of points, $\alpha$ represents a parameter to control respective contributions from the stableness term and a center-awareness term, and FrameCount represents the number of frames in the video clip to be used for normalization. The equation also includes Len $(S(p_i^j))$ denoting the number of points in the sequence of points $S(p_i^j)$ to represent the stableness of the point. The center-awareness term may be represented by Cent(S) to approximate a user's intention that the object located near or in the center of the frame is more important than the other objects or items in the frame.

Based on occasional departures of intended objects from the center area of the frame, the image-retrieval application 110 calculates an average distance of all of the points in the tracked sequence to represent the center-awareness term of each point in the sequence. The following equation identifies the center-awareness point $Cent(p_i^j)$:

$$Cent(p_i^j) = -\frac{\sum_{p \in S(p_i^j)} d(p, c)}{Len(S(p_i^j)) \times d(O, c)}$$

where d represents a distance from point p to the center of the frame c, and d (0, c) represents a distance from an origin of a frame to the center.

At 502, after computing the value of the points, if the points are not considered stable or not located in the center of the frame, the process proceeds to the left where the points are not selected based on the computation of the points 504.

Returning to 502, the computation may indicate the points satisfy the criteria of being stable and located in the center, the points are considered good points and proceed to 506.

At 506, the image-retrieval application 110 aggregates the good points selected to represent the video clip as a bag of descriptive words for retrieving images. The process 206 occurs by aggregating an occurrence of the descriptive words in all of the frames as an aggregated histogram 508. The aggregated histogram may be denoted as q, where each bin $q_i$ corresponds to the descriptive word $w_i$ in the vocabulary. Then, for each descriptive word, the image-retrieval application 110 aggregates the occurrence of the descriptive word in all of the frames, divided by the number of frames in the video clip, as a value in the corresponding bin of the query histogram.

The video clip includes a large amount of variations, such as different appearances of the object of interest taken from multiple viewpoints as recorded by the user 108, scaling of the object of interest, and illumination. This redundancy also provides useful information to understand a relationship between the features extracted in the frames and to achieve a comprehensive representation of the object of interest in the video clip.

The image-retrieval application 110 applies this information to construct synonymous relationships among all of the descriptive words 510. The image-retrieval application 110 constructs an affinity matrix M with an element $m_{ij}$ defined as:

$$M: m_{ij} = \frac{\sum_k \min(tc_i(S_k), tc_j(S_k))}{tc_i}$$

where the process 206 sets diagonal elements to zero. For each descriptive word $w_i$, a term count of the descriptive word found in all of the frames in the video clip may be denoted as $tc_i$, and a number of points in a corresponding sequence of points $S_k$ being quantized as $w_i$ may be denoted as $tc_i(S_k)$.

The image-retrieval application 110 then generates a contextual histogram from the aggregated histogram to partially address imperfections due to descriptive word quantization. This generation of the contextual histogram enables the term counts of synonym to boost each other to alleviate a problem that the similar feature descriptors may be quantized into different descriptive words. This equation represents the contextual histogram as:

$$cq = M \cdot q$$

where cq represents the contextual histogram, M represents the affinity matrix, and q represents the aggregated query histogram. Next, the image-retrieval application 110 combines the above equation with the aggregated query histogram to represent the "new" query representation as:

$$q_{new} = \beta q + (1-\beta) M \cdot q$$

where β represents a trade-off between an original query histogram and the contextual histogram.

FIG. 6 illustrates example diagrams 600 of a frame in the video clip and identified points located in the frame. At 602, a frame in a video clip illustrates how the user 108 typically attempts to record the object of interest in the center of the video. For instance, the object of interest is the building. At 604, the frame in the video clip illustrates SIFT points identified in the frame. For instance, circles 606 represent the SIFT points on the building as being stable and located in the center of the frame. On the other hand, triangles 608 represent the points on the trees and picnic table that are not considered stable or located in the center of the frame. The process 206 filters out the points shown with triangles 608 as the points represent the background, which are not useful in retrieving images in response to the query.

Creating the Image-Retrieval Model

Figure 7:
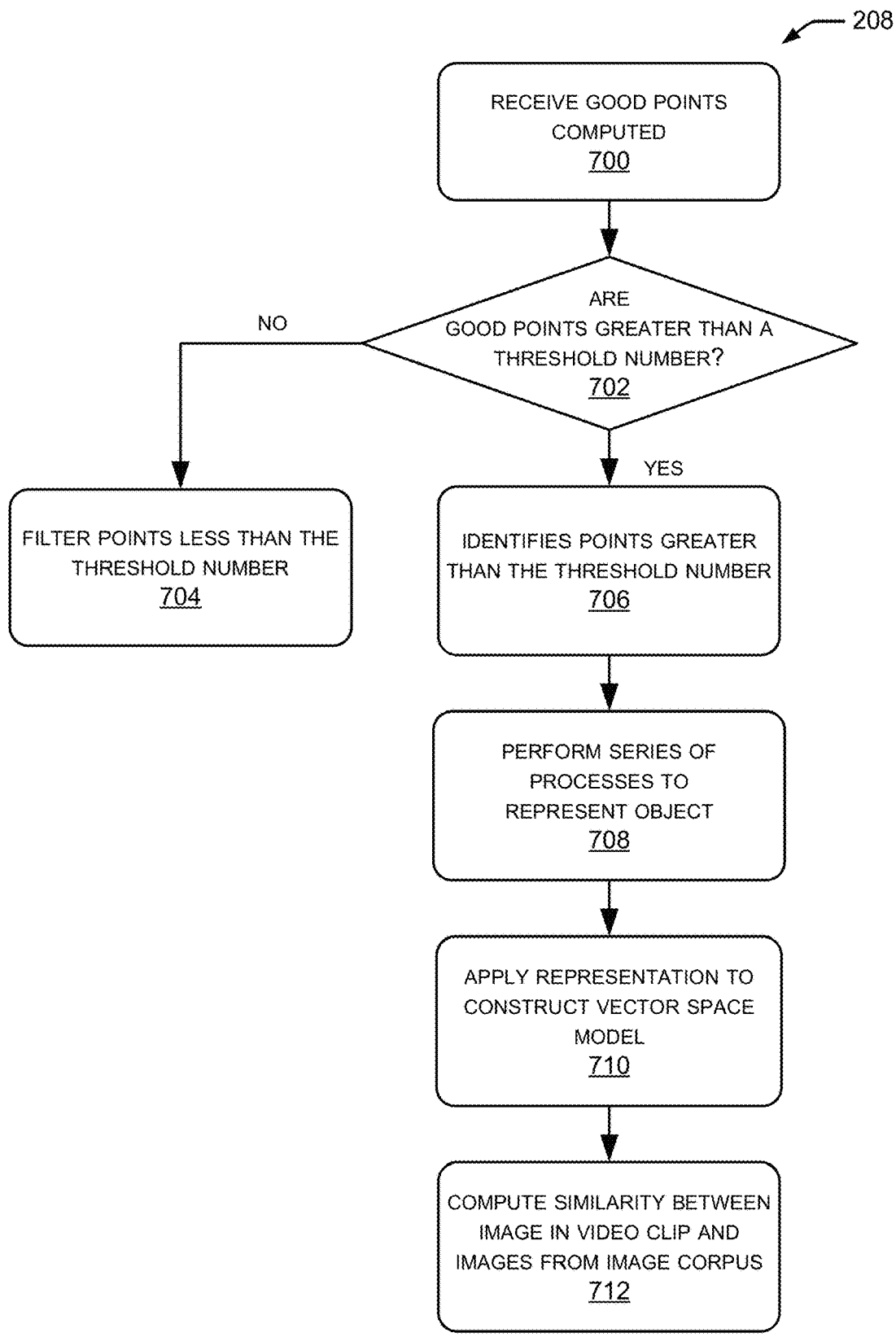
FIG. 7 illustrates an example process of creating an image-retrieval model.

FIG. 7 illustrates an example process 208 of creating the image-retrieval model. The image-retrieval application 110 receives the good points computed 700 based on the stability of the points and the center location of the points. The process 208 determines whether the computed good points are greater than a threshold number 702. The process moves to the left side when the points are less than the threshold number, to filter the points 704, which are not used in creating the image-retrieval model. If the points are greater than the threshold number, the process 208 proceeds to 706. Here, the image-retrieval model process 208 identifies the points greater than the threshold number for creating the image-retrieval model 706.

Next, the image-retrieval model process 208 performs a series of processes to represent the object of interest 708, which follows some of the processes along the same lines as the representation process 206. The processes may include aggregating the visual words to represent the video clip as bag of visual words 506, aggregating the occurrence of the descriptive words in all of the frames 508, and constructing synonymous relationships among the descriptive words 510. These processes create the representation of the object of interest in the video clip.

Then, the image-retrieval model process 208 applies the representation of the object of interest to construct a vector space model 710. The vector space model is a type of an algebraic model for representing objects or text documents as vectors of identifiers for image retrieval or information retrieval.

The image-retrieval model process 208 follows the image retrieval or information retrieval by a term frequency-inverse document frequency (tf-idf) weight to compute a similarity between the video clip and images in the image corpus 712. The tf-idf weight is a way of statistically analyzing how important a descriptive word is to an image in the image corpus 116 or database. The tf-idf weight evaluates the importance of the descriptive word. The descriptive word may increase in proportion to a number of times the descriptive word appears in the image, while the frequency of the descriptive word in the collection offsets the increase. For example, the tf identifies an importance of the descriptive word and the idf identifies the importance of the descriptive word and the image.

The equation to construct a vector space model includes:

$$q_v = q_{new} \cdot {}^* idf$$

where $\cdot^*$ represents element-wise multiplication of vectors, idf represents a vector, $idf_i$ represents an inverted document frequency of the descriptive word $w_i$. The image-retrieval application 110 retrieves top candidates based on the similarity scores of the images and all of the frames in the sequence based on the vector space model.

Re-Ranking Search Results

There may be false matches between the image from the video query in the frame sequence and the images retrieved from the corpus images 116. For instance, there may be a high similarity score on one frame due to the noisy information spread in the frames and a low score on the next frame causing the false matches. A solution to avoid the false matches includes analyzing the frames containing the items surrounding the object of interest that do not change much in their appearances, as the frame contains the items surrounding the object of interest that remains constant. For instance, the similarity scores computed between the video clip with the items surrounding the object of interest and an image from the database should not change. Thus, the image-retrieval application 110 re-ranks the search results based on the items surrounding the object of interest, also referred to as temporal consistency information.

The image-retrieval application 110 computes similarity scores of the image in the top results and all of the frames in the video clip based on the vector space model tf-idf weighting, denoted as $v(I, F_i)$, where $F_i$ represents the $i^{th}$ frame in the video clip. The image-retrieval application 110 regards $v(I, F_i)$, as a function of i to compute a gradient of the function using the following equation:

$$g_i = v(I, F_{i+1}) - v(I, F_i).$$

The image-retrieval application 110 averages the absolute values of the gradients to reflect the temporal consistency information of the matching scores for temporally adjacent frames. The average gradient may be calculated using the following equation:

$$g_i^a = \frac{\Sigma |g_i|}{FrameCount}$$

where the average gradient is combined with the similarity score to compute a new re-ranking score for the top results using:

$$r_i = -g_i^a + \gamma \bar{r}_i$$

where $\bar{r}$ represents an initial ranking score and γ shows the importance of the average gradient in the re-ranked scores.

In another implementation, the user 108 records the video, which may cause shaking of the camera. For the video clip submitted as a query with camera shake, the images in the image corpus 116 or the database may have a high average gradient, which implicitly increases the impact of temporal consistency in re-ranking. For the video clip with the camera shake, the mean of average gradients of the top images as the measure of the dynamic degree of the video clip, which is used to weight the average gradient term to achieve a new re-ranking function using the following equation:

$$r_i = -\frac{g_i^a}{\frac{1}{N}\sum_{i=1}^{N} g_i^a} + \gamma \bar{r}_i$$

where N represents the number of top images to be considered in the re-ranking.

Providing Retrieved Images and Information

FIGS. 8 and 9 illustrate example user interfaces 800 and 900, respectively, of providing retrieved images and information associated with the images to the user 108. In implementations, the image-retrieval application 110 provides the images for browsing or as part of services for a search engine provider.

FIG. 8 illustrates the user interface 800 of the example process 210 of providing the retrieved images and information associated with the images to the user 108 (discussed at high level above). This is one illustration of presenting the images and information being retrieved, as there may be many other techniques of presenting the search results. The video clip submitted is the Basilica.

At 802, the row indicates the images or the information to be displayed. At 804, along the left side illustrate numbers that may be used to indicate the ranking of the images retrieved along with the image retrieved. For instance, a number 1 indicates the image has been computed to have a similarity close to the image in the video clip. In other implementations, there may not be any type of numerical order shown. The user interface 800 shows at least three or more images retrieved of the Basilica. At 806, the information may provide a description, historical information, location information, and the like associated with the images.

FIG. 9 illustrates another example user interface 900 of providing retrieved images and information associated with the images to the user 108. The image-retrieval application returns the ranked list at 902, shown with four top candidate activities for the location video clip submitted as the query. The user 108 may provide feedback about the search results by rating the images or information and their relevancy to the query. For instance, the user 108 may access "Submit Evaluation" 904 to rate the images or the information based on a scale of 1 to 5, with 5 being "a best" and 1 being "a worst" relevancy to the query. The user interface 900 may additionally or alternatively employ other feedback mechanisms, such as star ratings, facial characters, thumbs up or thumbs down, and the like.

Illustrative Server Implementation

Figure 10:
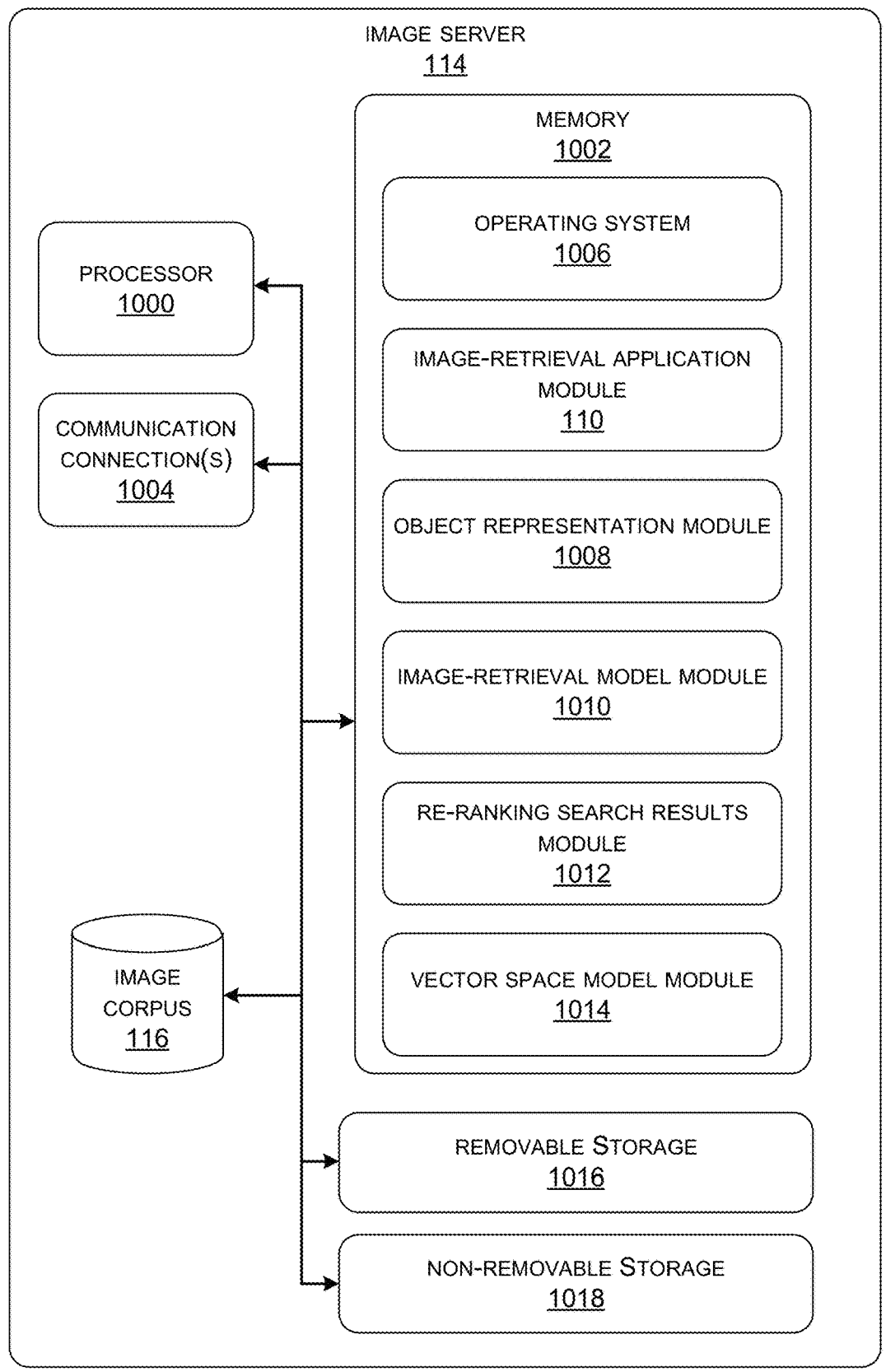
FIG. 10 is a block diagram showing an example image server usable with the environment of FIG. 1.

FIG. 10 is a block diagram showing an example image server 114 usable with the environment of FIG. 1. The image server 114 may be configured as any suitable system capable of services, which includes, but is not limited to, implementing the image-retrieval service 106 for online services, such as accessing the image-retrieval application 110 to provide images and information in response to the video clip submitted as the query. In one example configuration, the image server 114 comprises at least one processor 1000, a memory 1002, and a communication connection(s) 1004.

The processor 1000 may be implemented as appropriate in hardware, software, firmware, or combinations thereof. Software or firmware implementations of the processor 1000 may include computer-executable or machine-executable instructions written in any suitable programming language to perform the various functions described.

Memory 1002 may store program instructions that are loadable and executable on the processor 1000, as well as data generated during the execution of these programs. Depending on the configuration and type of computing device, memory 1002 may be volatile (such as random access memory (RAM)) and/or non-volatile (such as read-only memory (ROM), flash memory, etc.).

The communication connection(s) 1004 may include access to a wide area network (WAN) module, a local area network module (e.g., WiFi), a personal area network module (e.g., Bluetooth), and/or any other suitable communication modules to allow the image server 114 to communicate over the network(s) 104.

Turning to the contents of the memory 1002 in more detail, the memory 1002 may store an operating system 1006, a module for the image-retrieval application 110, an object representation module 1008, an image-retrieval model module 1010, a re-ranking search results module 1012, and a vector space model module 1014. Furthermore, there may be one or more applications (not shown) for implementing all or a part of applications and/or services using the image-retrieval service 106.

The image-retrieval service 106 provides access to the image-retrieval application module 110. The image-retrieval application module 110 receives the video clips submitted as queries, provides search results of images and information, and ranks top candidates as the list of images, interacts with the other modules to provide assistance to create the representation of the object of interest and to create the image-retrieval model.

The image-retrieval application module 110 further provides the display of the application on the user interface 112, extracting SIFT features from the frame of the video clip, quantizing the extracted SIFT features into descriptive words, and mining the extracted SIFT features and items surrounding the object of interest.

The object representation module 1008 identifies SIFT points that satisfy the criteria for stability and centrally located to create the representation of the object of interest. The object representation module 1008 identifies correlations between points in the frame to create the sequence of points to identify stable points.

The processes described above with references to FIGS. 1-9 may be performed by any of the modules or combination of the modules shown here. The image server 114 may include the image corpus 116 to store the collection of images, descriptive words, SIFT points, data for the matrices, representation of the object of interest, image-retrieval model, and the like. Alternatively, this information may be stored on a separate database.

The image server 114 may also include additional removable storage 1016 and/or non-removable storage 1018 including, but not limited to, magnetic storage, optical disks, and/or tape storage. The disk drives and their associated computer-readable media may provide non-volatile storage of computer readable instructions, data structures, program modules, and other data for the computing devices. In some implementations, the memory 1002 may include multiple different types of memory, such as static random access memory (SRAM), dynamic random access memory (DRAM), or ROM.

Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, erasable programmable read-only memory (EEPROM), flash memory or other memory technology, compact disc read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

The image server 114 as described above may be implemented in various types of systems or networks. For example, the server 114 may be a part of, including but is not limited to, a client-server system, a peer-to-peer computer network, a distributed network, an enterprise architecture, a local area network, a wide area network, a virtual private network, a storage area network, and the like.

Various instructions, methods, techniques, applications, and modules described herein may be implemented as computer-executable instructions that are executable by one or more computers, servers, or mobile devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. The functionality of the program modules may be combined or distributed as desired in various implementations. An implementation of these modules and techniques may be stored on or transmitted across some form of computer-readable media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:
one or more processors;
memory communicatively coupled to the one or more processors;
instructions stored in the memory and communicatively coupled to the one or more processors, the instructions when executed by the one or more processors causing the one or more processors to:
receive a video clip comprising an object of interest;
create a representation of the object of interest in the video clip;
retrieve images from a database based at least in part on the representation of the object of interest in the video clip;
calculate a similarity score for each image of the retrieved images based on one or more similarities between the retrieved images from the database and the video clip to identify candidate search images from the retrieved images;
analyze frames of the video clip containing the object of interest to identify background items to help identify the object of interest by calculating gradients of functions of the identified candidate search images and images in the video clip to determine temporal consistency of the identified background items surrounding the identified object of interest that should remain constant in frames of the video clip relative to the identified object of interest;
rank at least one of the identified candidate search images based on the similarity score for the at least one identified candidate search image and re-rank at least one of the identified candidate search images based on the determined temporal consistency of the identified background items surrounding the identified object of interest that should remain constant in frames of the video clip relative to the identified object of interest; and
display the re-ranked at least one of the identified candidate search images.

2. The system of claim 1, wherein the representation of the video clip comprises one or more descriptive words and each image of the retrieved images is associated with at least one descriptive word of the one or more descriptive words.

3. The system of claim 1, wherein the similarity scores are based at least in part on the representation of the video clip and element-wise multiplication of vectors, each vector of the vectors representing an inverted image frequency of a descriptive word used to describe the retrieved images and the video clip.

4. The system of claim 1, further comprising image-retrieval application instructions stored in the memory and communicatively coupled to the one or more processors, the image-retrieval application instructions when executed by the one or more processors causing the one or more processors to:
receive the video clip submitted as a query; and
extract features from one or more frames of the video clip.

5. The system of claim 4, the image-retrieval application instructions when executed by the one or more processors further cause the one or more processors to:
construct points of the features in consecutive frames of the one or more frames;
identify center points that are located in a center of a frame of the consecutive frames;
determine that an amount of the center points is less than a threshold number; and
in response to determining that the amount of the center points is less than the threshold number, filtering out the center points.

6. The system of claim 4, the image-retrieval application instructions when executed by the one or more processors further cause the one or more processors to:
construct points of the features in consecutive frames of the one or more frames;
identify center points that are located in a center of a frame of the consecutive frames;
determine that an amount of the center points is greater than a threshold number; and in response to determining that the amount of the center points is greater than the threshold number, creating the representation of the object of interest based at least in part on the center points.

7. A method comprising:
receiving a first frame of a video clip comprising an object of interest;
creating a representation of the object of interest in the video clip;
retrieving images from a database based at least in part on the representation of the object of interest in the first frame of the video clip;
calculating a first similarity score for each image of the retrieved images based on similarities between the retrieved images from the database and the representation of the first frame to identify candidate search images from the retrieved images;
receiving a second frame of the video clip comprising the object of interest;
analyzing the second frame of the video clip comprising the object of interest to identify background items to help identify the object of interest by calculating gradients of functions of the identified candidate search images and images in the video clip to determine temporal consistency of the identified background items surrounding the identified object of interest that should remain constant in frames of the video clip relative to the identified object of interest;
ranking at least one of the identified, candidate search images based on the respective first similarity score for the at least one identified candidate search image and re-ranking at least one of the identified candidate search images based on the determined temporal consistency of the identified background items surrounding the identified object of interest that should remain constant in frames of the video clip relative to the identified object of interest; and
displaying the re-ranked at least one of the identified candidate search images.

8. The method of claim 7, wherein analyzing the second frame of the video clip comprising the object of interest comprises:
comparing the candidate search images and a representation of the second frame to identify second similarities between the candidate search images and the representation of the second frame; and
calculating a second similarity score for each of the candidate search images based on the second similarities,
wherein ranking at least one of the candidate search images is based at least in part on the second similarity scores.

9. The method of claim 7, wherein the representation of the first frame of the video clip comprises one or more descriptive words, further comprising:
retrieving the images from the database based at least in part on the one or more descriptive words;
calculating gradients of functions of the candidate search images and the first frame of the video clip;
combining the first similarity scores with an average of the gradients of the functions; and
ranking the candidate search images based at least in part on the combining the first similarity scores with the average of the gradients of the functions.

10. The method of claim 7, further comprising:
receiving the video clip submitted as a query; and
extracting features from consecutive frames of the video clip.

11. The method of claim 10, further comprising:
constructing points representing the features in the consecutive frames;
identifying center points of the points that are located in a center of a frame of the consecutive frames;
determining that an amount of the center points is less than a threshold number; and
in response to determining that the amount of the center points is less than the threshold number, filtering out the center points.

12. The method of claim 10, further comprising:
constructing points representing the features in the consecutive frames;
identifying center points of the points that are located in a center of a frame of the consecutive frames;
determining that an amount of the center points is greater than a threshold number; and
in response to determining that the amount of the center points is greater than the threshold number, creating the representation of the object of interest based at least in part on the center points.

13. The method of claim 7, wherein the first similarity scores are based at least in part on the representation of the first frame of the video clip and element-wise multiplication of vectors, each vector of the vectors representing an inverted image frequency of a descriptive word used to describe the retrieved images and the video clip.

14. One or more computer-readable storage media storing instructions that, when executed by a processor, perform acts comprising:
receiving a first frame of a video clip comprising an object of interest;
creating a representation of the object of interest in the first frame of the video clip;
retrieving images from a database based at least in part on the representation of the object of interest in the first frame of the video clip;
calculating a first similarity score for each image of the retrieved images based on similarities between the retrieved images from the database and the representation of the first frame to identify candidate search images from the retrieved images;
receiving a second frame of the video clip comprising the object of interest;
analyzing the second frame of the video clip comprising the object of interest to identify background items to help identify the object of interest by calculating gradients of functions of the identified candidate search images and images in the video clip to determine temporal consistency of the identified background items surrounding the identified object of interest that should remain constant in frames of the video clip relative to the identified object of interest;
ranking at least one of the identified candidate search images based on the respective first similarity score for the at least one identified candidate search image and re-ranking at least one of the identified candidate search images based on the determined temporal consistency of the identified background items surrounding the identified object of interest that should remain constant in frames of the video clip relative to the identified object of interest; and
displaying the re-ranked at least one of the identified candidate search images.

15. The one or more computer-readable storage media of claim 14,
wherein analyzing the second frame of the video clip comprising the object of interest comprises:
comparing the candidate search images from the database and the representation of the second frame to identify second similarities between the candidate search images and the representation of the second frame; and
calculating a second similarity score for each of the candidate search images based on the second similarities,
wherein ranking at least one of the candidate search images is based at least in part on the second similarity scores.

16. The one or more computer-readable storage media of claim 14, wherein the representation of the first frame of the video clip comprises one or more descriptive words, further comprising instructions that, when executed by a processor, perform acts comprising:
retrieving the images from the database based at least in part on the one or more descriptive words;
calculating gradients of functions of the candidate search images and the first of the video clip;
combining the first similarity scores with an average of the gradients of the functions; and
ranking the candidate search images based at least in part on the combining the first similarity scores with the average of the gradients of the functions.

17. The one or more computer-readable storage media of claim 14, wherein the representation of the first frame of the video clip comprises one or more descriptive words and each image of the retrieved images is associated with at least one descriptive word of the one or more descriptive words.

* * * * *